United States Patent
Bruce

(10) Patent No.: US 9,027,664 B2
(45) Date of Patent: May 12, 2015

(54) WAVY AGRICULTURAL TILLAGE BLADE WITH SHARPENED EDGE

(71) Applicant: Douglas G. Bruce, West Des Moines, IA (US)

(72) Inventor: Douglas G. Bruce, West Des Moines, IA (US)

(*) Notice: Subject to any disclaimer, the term of this patent is extended or adjusted under 35 U.S.C. 154(b) by 119 days.

(21) Appl. No.: 13/956,678

(22) Filed: Aug. 1, 2013

(65) Prior Publication Data

US 2015/0034344 A1   Feb. 5, 2015

(51) Int. Cl.
| A01B 59/00 | (2006.01) |
| A01B 15/16 | (2006.01) |
| A01B 23/06 | (2006.01) |
| B23P 15/28 | (2006.01) |

(52) U.S. Cl.
CPC ............ *A01B 15/16* (2013.01); *A01B 23/06* (2013.01); *B23P 15/28* (2013.01)

(58) Field of Classification Search
CPC ...... A01B 15/18; A01B 23/06; A01B 29/048; A01B 35/28; A01B 49/02; A01C 5/064; B21D 53/26; B21H 1/02; Y10T 29/49448; B23P 15/28
USPC .................. 29/284, 891; 111/63, 66; D15/29; 172/531, 532, 537, 539, 540, 555, 603, 172/604, 765, 518
See application file for complete search history.

(56) References Cited

U.S. PATENT DOCUMENTS

| 506,671 | A | | 10/1893 | Corbin | |
| 3,213,514 | A | | 10/1965 | Evans | |
| 3,559,748 | A | * | 2/1971 | Shelton | 172/604 |
| 3,959,863 | A | | 6/1976 | Bruce | |
| 4,729,802 | A | * | 3/1988 | Matalis et al. | 148/565 |
| 5,649,602 | A | | 7/1997 | Bruce | |
| 7,143,838 | B2 | * | 12/2006 | Piccat | 172/604 |
| 7,497,270 | B2 | * | 3/2009 | Bruce | 172/604 |
| 7,992,651 | B2 | * | 8/2011 | Bruce | 172/604 |
| 2011/0147018 | A1 | | 6/2011 | Bruce | |
| 2011/0162856 | A1 | | 7/2011 | Bruce | |
| 2011/0240319 | A1 | | 10/2011 | Sanderson | |

FOREIGN PATENT DOCUMENTS

SU        1428240        10/1988

OTHER PUBLICATIONS 8 pages—International Search Report and Written Opinion of ISA of corresponding international application.
12-pgs of color brochure showing True-Tandem 330 Turbo by CASE IH.
2-pgs showing Excalibur blades by Kuhn Krause.
8-pg color brochure showing EXCELERATOR 8000 by Kuhn Krause.
3 pgs—showing Turbo and Vortex Coulters.

* cited by examiner

*Primary Examiner* — Robert Pezzuto
(74) *Attorney, Agent, or Firm* — Sturm & Fix LLP

(57) ABSTRACT

A method of making a tillage blade by obtaining a generally circular sheet metal steel disc having an outer peripheral edge. Waves are made in the outer peripheral edge of a circular steel disc in a predetermined pattern while the steel is cold. The outer peripheral edge is then sharpened at a predetermined acute angle with respect to a first plane by grinding. Then the disc is heat treated to make it harder so it will wear longer. If it is desired to have a concave/convex disc, instead of a coulter, then during the heat treating process the disc is deformed so that the sharpened portions of the peripheral edge remain generally in the first plane but a central portion of the disc is disposed at least partially in a second plane which is parallel to but spaced from the first plane.

11 Claims, 7 Drawing Sheets

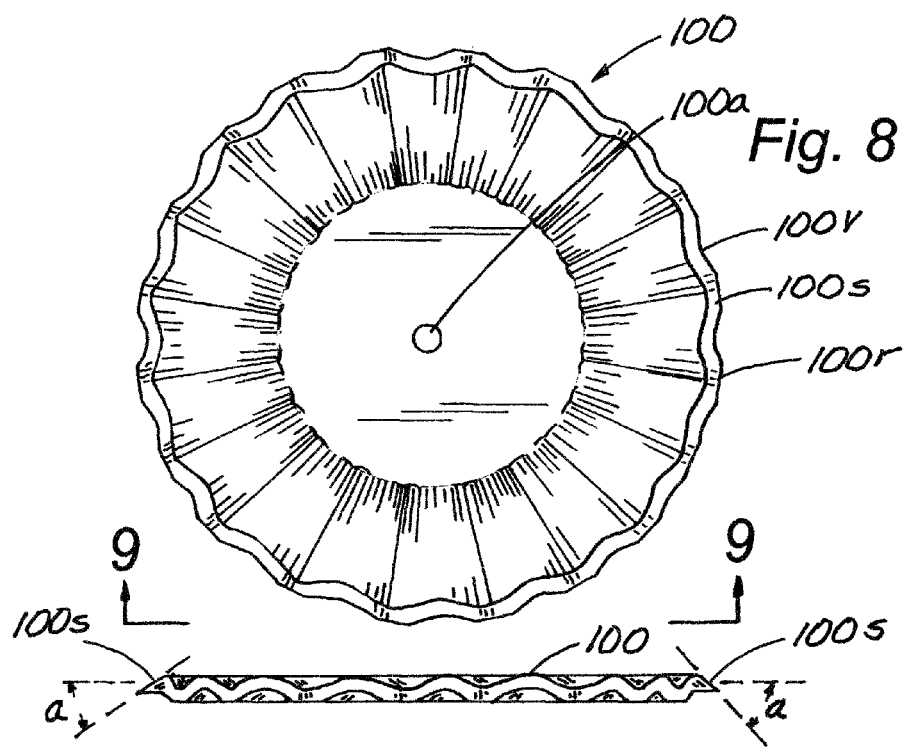
Fig. 8
Fig. 9
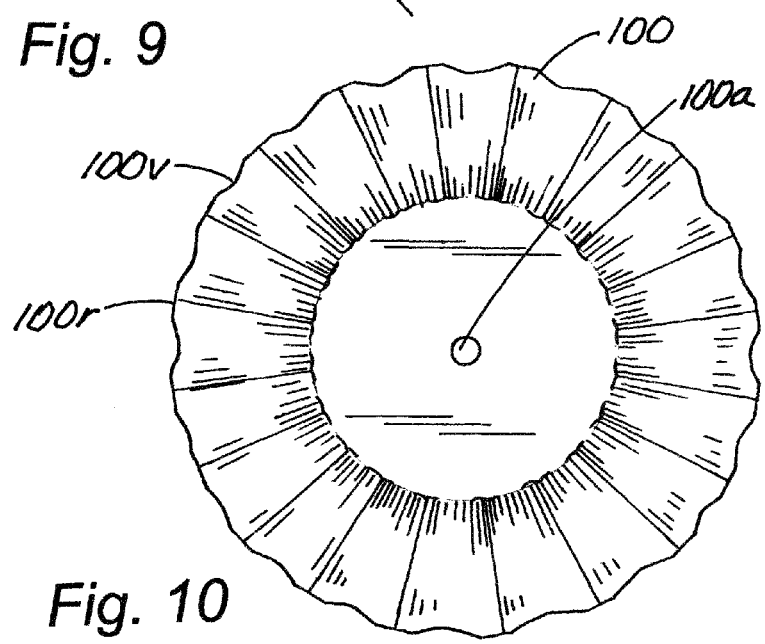
Fig. 10

WAVY AGRICULTURAL TILLAGE BLADE WITH SHARPENED EDGE

TECHNICAL FIELD

This invention relates generally to an agricultural tillage blade and more particularly to a wavy agricultural tillage blade and a method of making it.

BACKGROUND

Wavy and fluted coulters for use in agricultural tillage implements are well known. For example, U.S. Pat. No. 5,649,602 to Bruce shows a wavy coulter that is made by cutting out a circular piece from a thick but flat piece of sheet metal, sharpening the outer peripheral edge thereof, using dies to deform the radially outer portion thereof to a particular wavy shape and then heat treating the blade to harden it so it will stay sharp and not become dull prematurely.

U.S. Published Pat. Application No. 2011/0240319 to Sanderson shows a fluted, scalloped and therefore wavy blade with an outer peripheral edge sharpened edge. A similar tillage blade is marketed under the trademark EXCALIBUR® and used on an Excelerator® Vertical Tillage System from Kuhn Krause. Looking at the photographs of this EXCALIBUR® blade makes it appear that the sharpened edge lies in a single plane, which single plane appears to be a vertical plane perpendicular to the axis of rotation thereof when the EXCALIBUR® blade is installed onto an Excelerator® Vertical Tillage System from Kuhn Krause.

A problem with some prior art wavy tillage blades of the aforementioned type is keeping them sharp after extended usage.

Accordingly, there is a need for a wavy coulters and discs that will efficiently cut through trash above the top of the soil and stay sharper longer than prior art wavy coulters.

SUMMARY OF THE INVENTION

The present invention relates to a method of making a tillage blade beginning with cutting out a generally circular steel disc from a sheet of steel. The disc would have a central portion with a central axis of rotation. Waves would then be formed in at least the outer peripheral edge of the circular steel disc in a predetermined pattern. After that, the peripheral edge of the disc would be sharpened at a predetermined acute angle with respect to a first plane extending through sharpened peripheral edge of the disc, which first plane is perpendicular to the axis of rotation. The last step is to heat treat the disc after the disc has been sharpened to harden the steel to make it remain sharper and last longer. Optionally, during the heat treating process the disc can be further deformed into a concave/convex shape.

BRIEF DESCRIPTION OF THE DRAWINGS

The above needs are at least partially met through provision of the apparatus described in the following detailed description, particularly when studied in conjunction with the drawings, wherein:

FIG. 8 is a side elevational view of another embodiment of a wavy disc that has the waves extending straight radially outwardly after it has been sharpened and heat treated and is complete and ready to be used.

FIG. 9 is a side elevational view of the disc of FIG. 8 taken along line 9-9 FIG. 8;

FIG. 10 is a side elevational view of the other side of the wavy disc shown in FIG. 8;

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Figure 2:
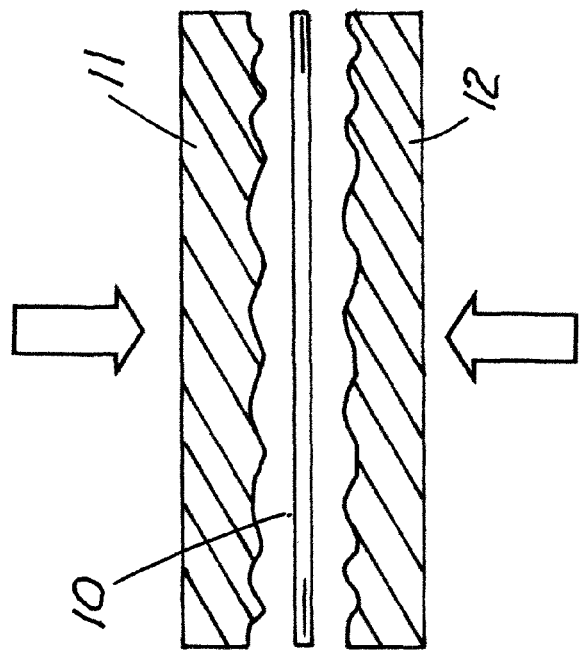
FIG. 2 is a schematic view of the disc shown between two dies so that when the dies are pressed together with the disc between them the disc will be permanently deformed to have a predetermined wavy configuration at least on the outer periphery thereof.
Figure 1:
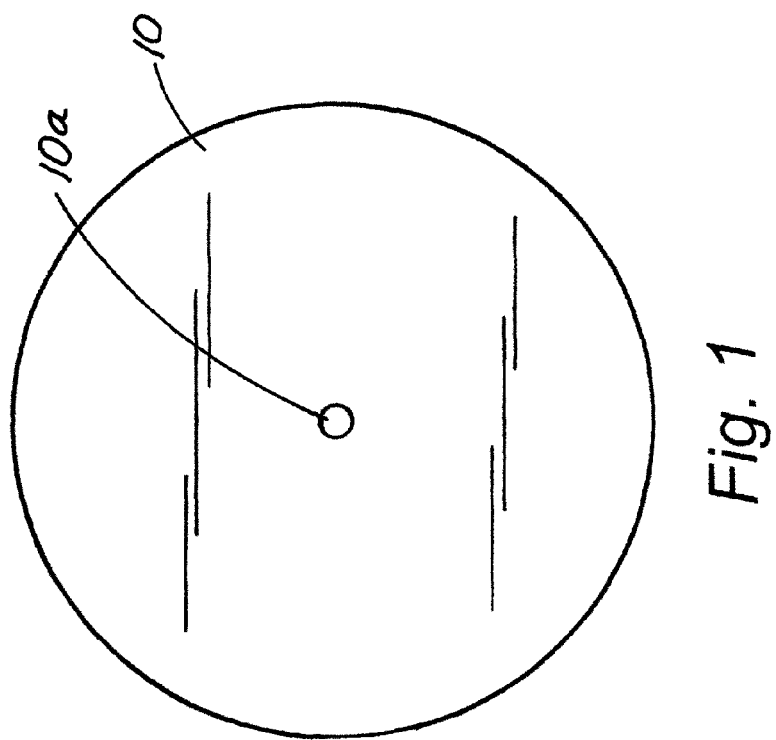
FIG. 1 is a top plan view of a disc that has been cut from sheet metal, preferably one of uniform thickness.

Referring now to the drawings, wherein like reference numerals indicate identical or similar parts throughout the several views, FIG. 1 shows circular sheet of metal (10) that is stamped out or cut out of a larger sheet of metal such as steel (not shown).

Figure 3:
FIG. 3 is a side elevational view of the disc after it has been deformed in the step shown in FIG. 2 and before it is sharpened or heat treated.

After that, waves, such as those shown in U.S. Pat. No. 5,649,602 to Bruce are formed in the plate (10) by forcing dies (11) and (12) towards each other while the circular disc (10) is between them, thereby forming what is shown in FIG. 3, which can be identical to what is shown in the Bruce coulter of U.S. Pat. No. 5,649,602 except that the peripheral edge is not sharpened in the present invention until after the waves are formed in the disc (10).

Figure 4:
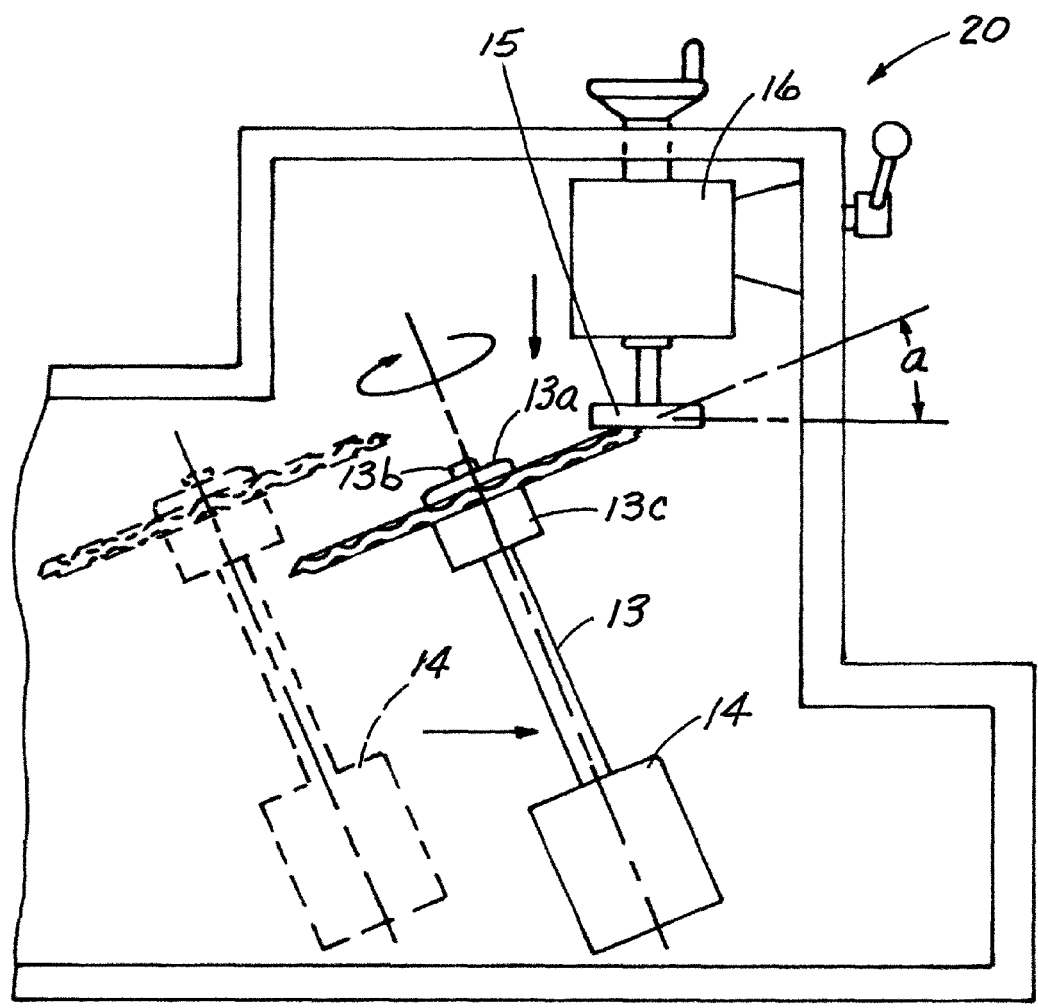
FIG. 4 is a simplified schematic view showing how the outer peripheral edge of the wavy disc is sharpened before it is heat treated.
Figure 5:
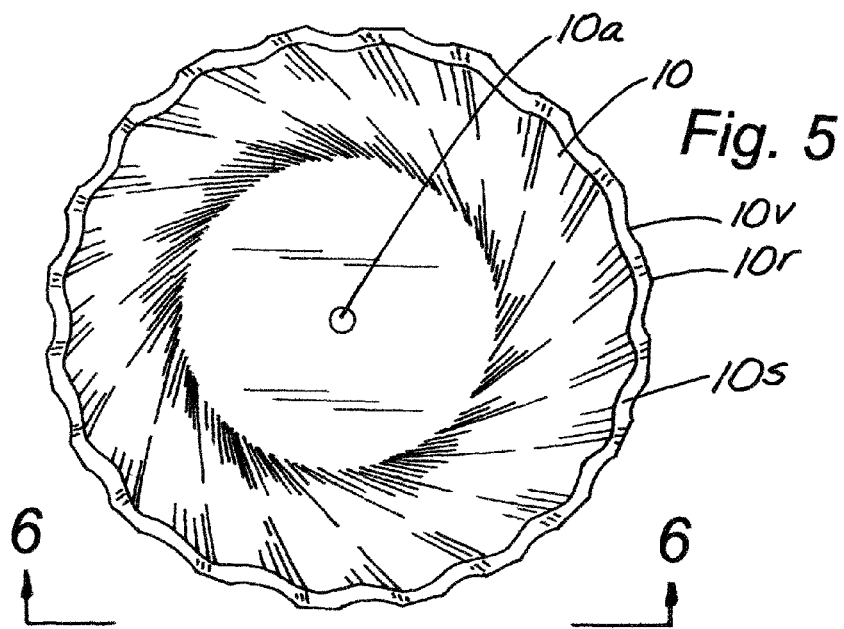
FIG. 5 is a side elevational view of a wavy disc after it has been sharpened and heat treated and is complete and ready to be used.
Figure 6:
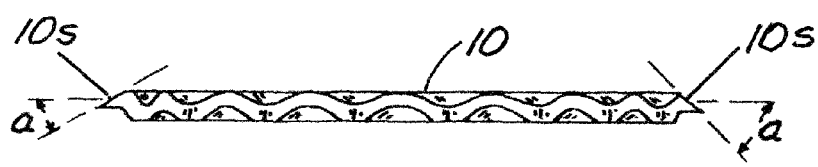
FIG. 6 is a side elevational view of the disc taken along line 6-6 FIG. 5.
Figure 7:
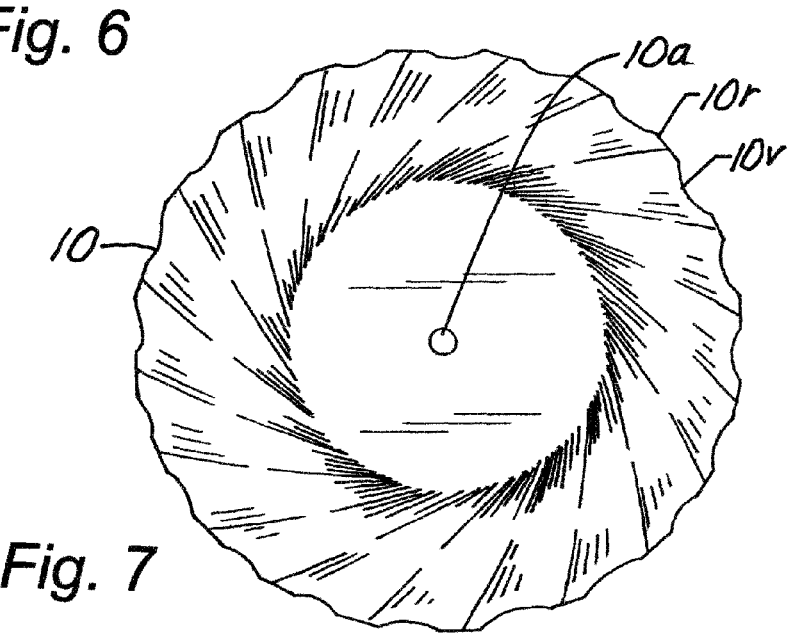
FIG. 7 is a side elevational view of the other side of the wavy disc shown in FIG. 5.

The next step of the process for making discs or coulters using the present invention is to place the wavy disc (10) shown in FIG. 3 on a spindle (13) while in the dashed line position of FIG. 4, and tightening the bolt (13b) into part (13c) which is rigidly attached to spindle (13). This causes the wavy disc (10) to be clamped tightly between members (13a) and (13c). After that, the spindle (13), wavy disc (10) and motor (14) is slide to the position shown in solid lines in FIG. 4 so the peripheral edge of the wavy disc (10) is biased against the rotary grinder (15) which is rotated by a an electric motor (16) in a conventional way. As the motor (15) rotates the wavy disc (10) at the same time that the abrasive grinder wheel (15) is rotated to eventually form a sharpened bevel edge (10s) as is shown in FIGS. 5 and 6. FIG. 7 shows the opposite side of the wavy disc (10) that does not have the sharpened bevel edge (10s) thereon.

The angle "a" shown in FIGS. 4 and 6 is ideally approximately 30 degrees but this angle "a" can be in a range of between 15 degrees and 45 degrees to work adequately.

FIGS. 8-10 show a wavy coulter (100) that is like the wavy disc (10) of FIGS. 5-7 except that the waves in the wavy coulter (100) extend radially straight outwardly unlike the waves of wavy disc (10) that are formed at an angle with respect to a radial line extending straight out from the center axis of rotation (10a) in the case of the FIGS. 5-7 embodiment and from the center axis of rotation (100a) in the case of the disc/coulter (100) shown in FIGS. 8-10.

The last step before the coulter/disc (10) of FIGS. 5-7 embodiment is ready to be used as an earth working tillage blade is to heat treat it so that it is hardened enough that it will not wear out prematurely.

Figure 11:
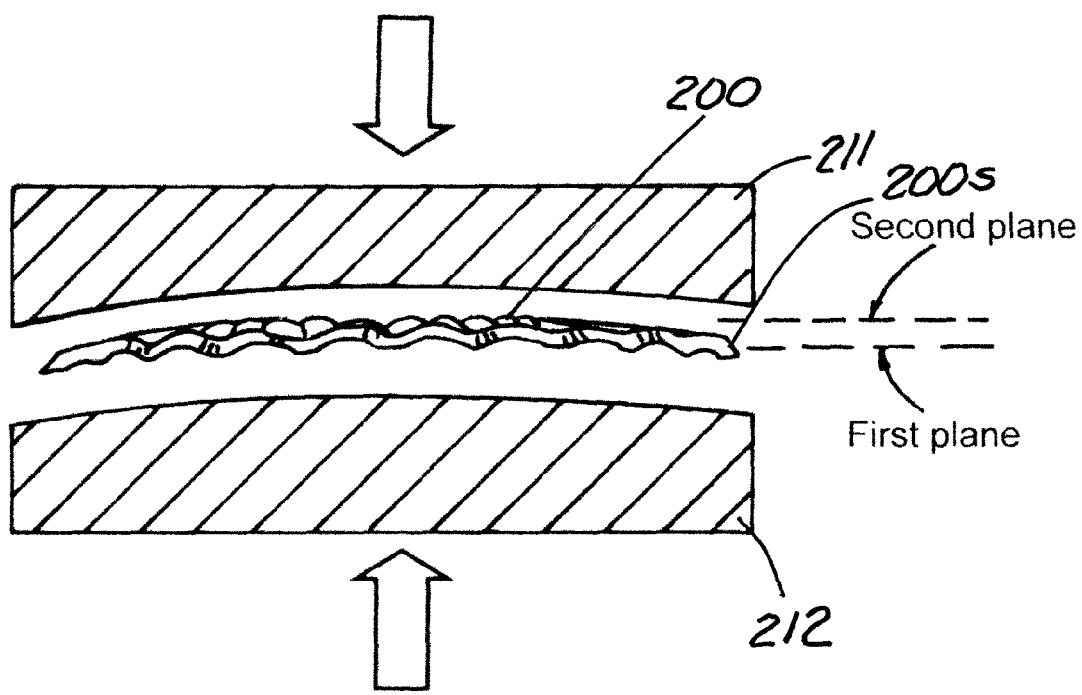
FIG. 11 is a schematic view of two dies being used to deform a disc to a somewhat concave/convex shape during a heat treating step.
Figure 12:
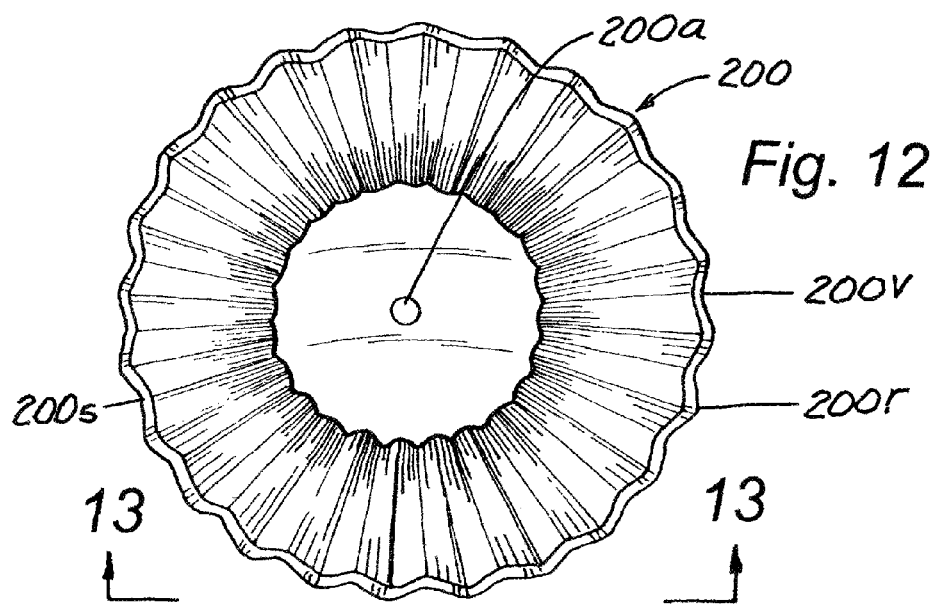
FIG. 12 is a side elevational view of another embodiment of a concave/convex wavy disc that has the waves extending straight radially outwardly after it has been sharpened and heat treated using the step shown in FIG. 11 and is therefore complete and ready to be used, the sharpened edge being on the concave side.
Figure 13:
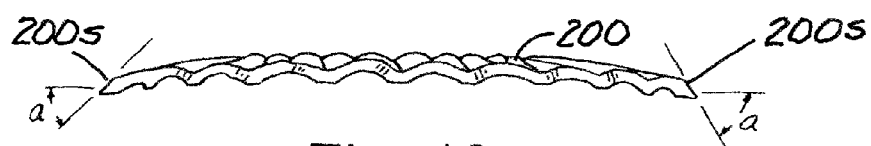
FIG. 13 is a side elevational view of the disc of FIG. 12 taken along line 13-13 FIG. 12.
Figure 14:
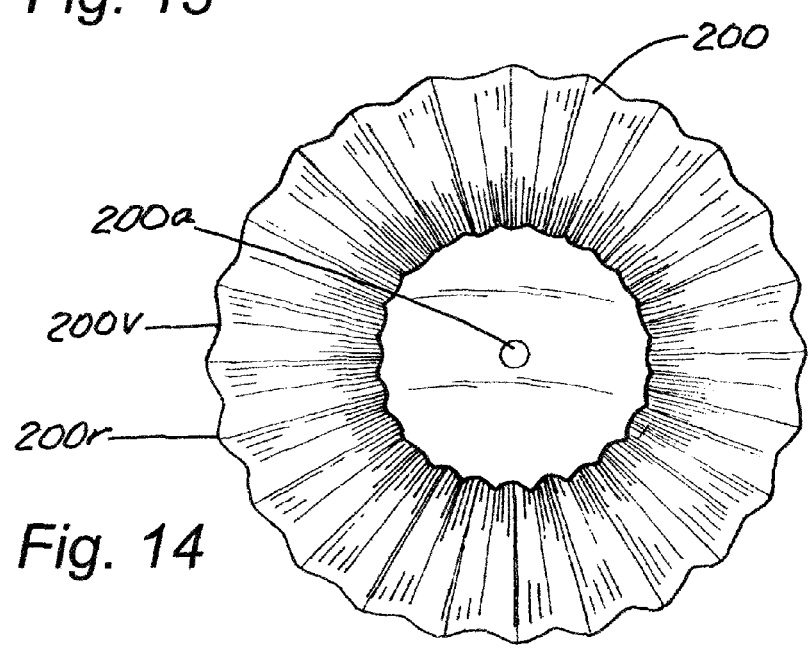
FIG. 14 is a side elevational view of the other side of the wavy disc shown in FIG. 12.

Looking to FIG. 11, if it is desired to have a concave/convex disc like the disc (200) of FIGS. 12-14 or the disc (300) like the one shown in FIGS. 15-18, instead of ones like coulters (10) and (100), then during the heat treating process the disc (200) is deformed between dies (211) and (212) to a concave/convex shape while the disc 200 is hot. When that is done the peripheral edge (200s) is disposed in a first plane and the central opening at axis (200a) is disposed in a second plane, thereby forming a generally convex/concave shape.

In the embodiment (200) shown in FIGS. 11-14, the sharpened bevel edge (200s) is on the concave side, the upper side as shown in FIGS. 11 and 13.

Figure 15:
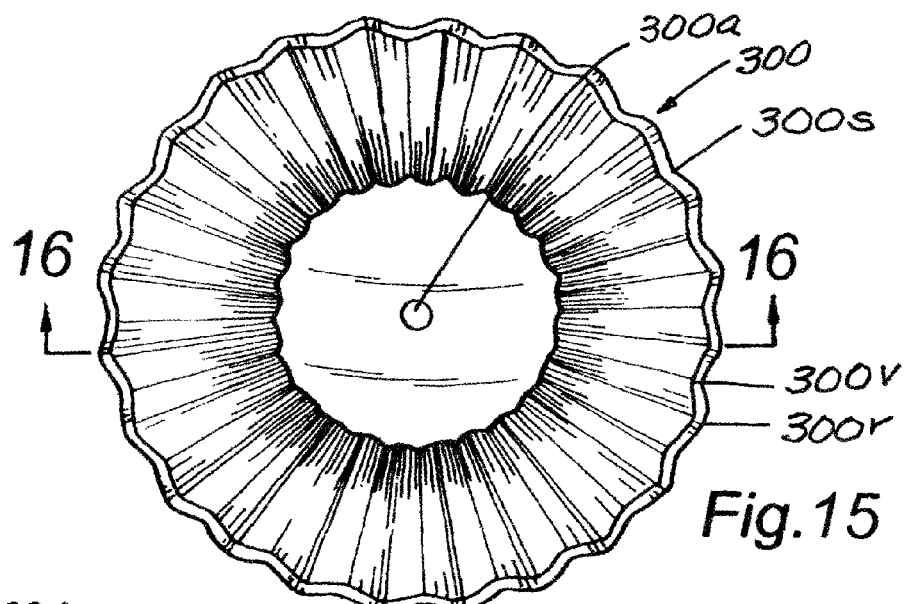
FIG. 15 is a side elevational view of still another embodiment of a concave/convex wavy disc that has the waves extending straight radially outwardly after it has been sharpened and heat treated using the step shown in FIG. 11 and is therefore complete and ready to be used, the sharpened edge being on the convex side.
Figure 16:
FIG. 16 is a side elevational view of the disc of FIG. 15 taken along line 16-16 FIG. 15.
Figure 17:
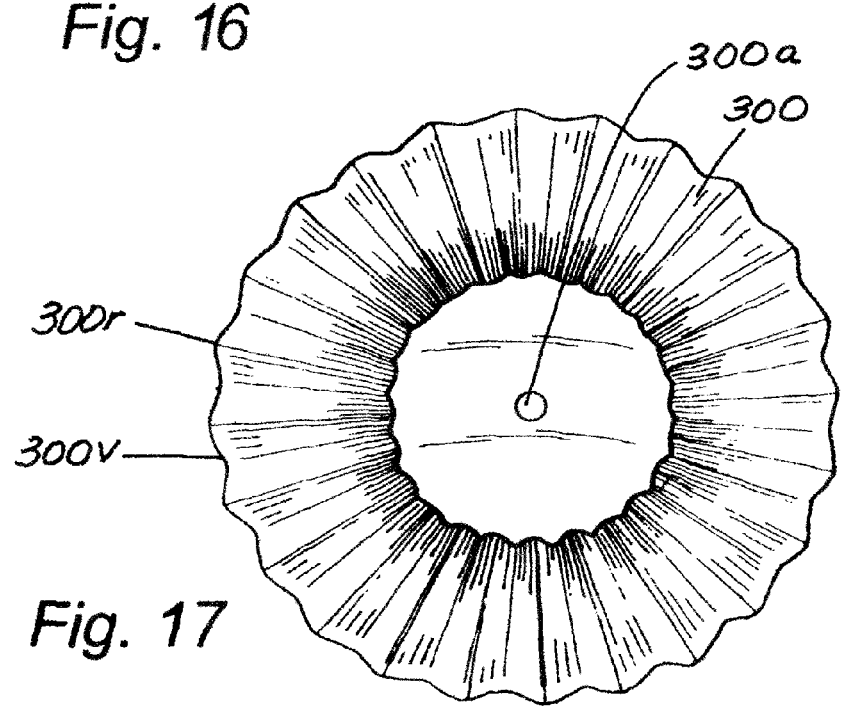
FIG. 17 is a side elevational view of the other side of the wavy disc shown in FIG. 15.

However, in the embodiment (300) shown in FIGS. 15-17, the sharpened bevel edge (300s) is on the convex side, it being understood that during the heat treating/hardening process in producing the embodiment of disc (300) is just like that shown in FIG. 11, except that the sharpened side (300s) would be up and not down like sharpened edge (200s) shown in the heat treating and forming step of FIG. 11.

A major benefit of forming a disc or coulter in the method described above with respect to coulters/discs (10/100/200/300) is that the cutting through the earth is done at an angle that is different that if the blade (10) of FIG. 1 is sharpened before the waves are formed in it as is done in U.S. Pat. No. 5,649,602 to Bruce. This results in a completely different cutting surface shape. This novel shape, as it turns out, cuts through trash on top of the soil and into the soil better than prior art coulters and discs of a similar type. This is due to the combination of parts (like ridges (10r)) of the coulters/discs (10/100/200/300) digging into the soil farther than other parts (like valleys (10v)) of the outer peripheral edges of the coulters/discs in combination with a beveled sharpened edge that is not perpendicular to the axis of rotation of the coulters/discs. The waves used in the coulters/discs (10/100/200/300) are wide enough that they can be formed in the disc (10) while the disc (10) is cold. This is in contrast to trying to form narrow, close together, flutes in a disc plate used in the prior art which require that the flutes be formed during a heat treating process so the metal does not deform too much.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

I claim:

1. A method of making a tillage blade comprising:
    obtaining a generally circular sheet metal steel disc having a outer peripheral edge, the disc being disposed generally in a first plane, the disc having a central portion, the central portion having central axis of rotation perpendicular to the first plane;
    making waves in the outer peripheral edge of a circular steel disc in a predetermined pattern;
    sharpening the peripheral edge by grinding the peripheral edge, after making the waves in the outer peripheral edge, so that all of portions of the peripheral edge that have been ground are disposed generally at a predetermined acute angle with respect to the first plane, the first plane extending through such portions of the peripheral edge; and
    heat treating the disc after the disc has been sharpened.

2. The method of claim 1 wherein during the heat treating process deforming the disc so that the sharpened portions of the peripheral edge remain generally in the first plane but the central portion of the disc is disposed at least partially in a second plane which is parallel to but spaced from the first plane.

3. The method of claim 1 wherein the predetermined acute angle in a range of between 15 degrees and 45 degrees.

4. The method of claim 1 wherein the sharpened portion of the outer periphery does not lie in a single plane.

5. An agricultural tillage blade made by a process comprising:
    obtaining a generally circular sheet metal steel disc having a outer peripheral edge, the disc being disposed generally in a first plane, the disc having a central portion, the central portion having central axis of rotation perpendicular to the first plane;
    making waves in the outer peripheral edge of the circular steel disc in a predetermined pattern;
    sharpening the peripheral edge by grinding the peripheral edge, after making the waves in the outer peripheral edge, so that all of portions of the peripheral edge that have been ground are disposed generally at a predetermined acute angle with respect to the first plane, the first plane extending through such portions of the peripheral edge; and
    heat treating the disc after the disc has been sharpened.

6. An agricultural tillage blade made by a process comprising:

obtaining a generally circular sheet metal steel disc having a outer peripheral edge, the disc being disposed generally in a first plane, the disc having a central portion, the central portion having central axis of rotation perpendicular to the first plane;

making waves in the outer peripheral edge of the circular steel disc in a predetermined pattern;

sharpening the peripheral edge by grinding the peripheral edge, after making the waves in the outer peripheral edge, so that all of portions of the peripheral edge that have been ground are disposed generally at a predetermined acute angle with respect to the first plane, the first plane extending through such portions of the peripheral edge;

heat treating the disc after the disc has been sharpened; and during the heat treating process deforming the disc so that the sharpened portions of the peripheral edge remain generally in the first plane but the central portion of the disc is disposed at least partially in a second plane which is parallel to but spaced from the first plane.

7. An agricultural tillage comprising:

a sheet metal steel disc having a outer peripheral edge, the disc being disposed generally in a first plane, the disc having a central portion, the central portion having central axis of rotation perpendicular to the first plane and waves disposed in the outer peripheral edge of the steel disc in a predetermined pattern; and the entire outer peripheral edge being at disposed at a predetermined constant acute angle with respect to the first plane, the first plane extending through such portions of the peripheral edge.

8. The agricultural tillage blade of claim 7 wherein the sharpened portions of the peripheral edge are disposed generally in the first plane but the central portion of the disc is disposed at least partially in a second plane which is parallel to but spaced from the first plane.

9. The agricultural tillage blade of claim 8 wherein the second plane is on a convex side of the generally circular sheet metal steel disc, the side opposite the convex side being a concave side of the disc, crests and valleys disposed in the sharpened portions of the outer peripheral edge, the sharpened portions of the valleys of the peripheral edge extending radially outwardly farther than crest portions of the peripheral edge when looking at the disc from the convex side thereof.

10. The agricultural tillage blade of claim 7 wherein the waves comprise a plurality of crests and valleys disposed in the sharpened portions of the outer peripheral edge and wherein one of the plurality of crests or the plurality of valleys extend outwardly from the axis of rotation beyond the other of the plurality of crests or the plurality of valleys.

11. The agricultural tillage blade of claim 7 wherein the sharpened portions of the peripheral edge are disposed generally in the first plane but the central portion of the disc is disposed at least partially in a second plane which is parallel to but spaced from the first plane and wherein the sharpened portions of the valleys of the peripheral edge extending outwardly farther from the axis of rotation than crest portions of the peripheral edge when looking at the disc from the convex side thereof.

* * * * *